United States Patent
Kobayashi

(10) Patent No.: US 8,570,557 B2
(45) Date of Patent: Oct. 29, 2013

(54) ELECTRONIC EQUIPMENT SYSTEM, ELECTRONIC EQUIPMENT, AND OPTIONAL APPARATUS

(75) Inventor: Akihiro Kobayashi, Osaka (JP)

(73) Assignee: Kyocera Mita Corporation (JP)

( * ) Notice: Subject to any disclaimer, the term of this patent is extended or adjusted under 35 U.S.C. 154(b) by 1118 days.

(21) Appl. No.: 12/398,211

(22) Filed: Mar. 5, 2009

(65) Prior Publication Data

US 2009/0225361 A1    Sep. 10, 2009

(30) Foreign Application Priority Data

Mar. 6, 2008   (JP) ................. 2008-055719

(51) Int. Cl.
   *G06F 3/00*   (2006.01)
(52) U.S. Cl.
   USPC ........................................ 358/1.15; 710/15
(58) Field of Classification Search
   None
   See application file for complete search history.

(56) References Cited

U.S. PATENT DOCUMENTS

2006/0104688 A1* 5/2006 Motoyama et al. ........... 399/396
2007/0120313 A1* 5/2007 Wada ........................... 271/9.02

FOREIGN PATENT DOCUMENTS

| JP | 3-265059 | 11/1991 |
| JP | 2000-315277 | 11/2000 |
| JP | 2004103026 | 4/2004 |
| JP | 2007253486 | 10/2007 |

* cited by examiner

*Primary Examiner* — Twyler Haskins
*Assistant Examiner* — Lennin Rodriguezgonzalez
(74) *Attorney, Agent, or Firm* — Gerald E. Hespos; Michael J. Porco; Matthew T. Hespos

(57) ABSTRACT

In a case where a select communication with an apparatus main body is performed, an option side controller selected by a select signal determines whether a command-save-bit is true or not. In a case where the command-save-bit is not true, the option side controller executes a processing in accordance with the command signal. In a case where the command-save-bit is true, the option side controller stores contents of the command signal into a memory. In a case where the simultaneous communication with the apparatus main body is performed, all of the option side controllers read the command signal from the memory and executes a processing in accordance with the command signal.

8 Claims, 4 Drawing Sheets

FIG. 2

| PATTERN OF SELECT LINES | SELECTED APPARATUS |
|---|---|
| 001 | PF12a |
| 010 | PF12b |
| 011 | PF12c |
| 100 | PF12d |
| 111 | SIMULTANEOUS COMMUNICATION |

ELECTRONIC EQUIPMENT SYSTEM, ELECTRONIC EQUIPMENT, AND OPTIONAL APPARATUS

BACKGROUND OF THE INVENTION

1. Field of the Invention

The present invention relates to an electronic equipment as an electronic equipment system apparatus main body having a plurality of optional apparatuses connected to an apparatus main body through a bus, an optional apparatus, and an image forming apparatus.

2. Description of the Related Art

Generally, an image forming apparatus such as a printer includes an image forming section which forms an image on a sheet and a sheet tray which supplies the sheet to the image forming section. In many cases, a plurality of sheet trays are stacked for use in accordance with a user's demand. In such case, an apparatus main body having an image forming section and each of the sheet trays are connected through a bus line, and a command signal is transmitted from the apparatus main body so that driving of each sheet tray is controlled.

In particular, the bus line has a select line and a serial line, and any one sheet tray is selected by the select line from among the plurality of sheet trays. The selected sheet tray accepts the command signal transmitted through the serial line and executes a processing in accordance with the command signal.

Further, as disclosed in Japanese Patent Unexamined Publication No. Hei 3-265059 and Japanese Patent Unexamined Publication No. 2000-315277, there are the cases where a command signal is transmitted in a simultaneous communication from an apparatus main body to all of sheet trays (optional apparatuses).

SUMMARY OF THE INVENTION

The present invention was made by further improving a control which is executed when a simultaneous communication is performed by an apparatus main body with respect to the optional apparatuses connected to the apparatus main body.

In summary, an electronic equipment system in accordance with an aspect of the present invention is provided with an apparatus main body and a plurality of optional apparatuses connected to the apparatus main body through a bus line which is capable of transmitting and receiving a signal, and the electronic equipment system includes: a main body side controller which is provided in the apparatus main body, the main body side controller outputting a command signal and a select signal to each of the optional apparatuses through the bus line; an option side controller which is provided in each of the optional apparatuses, the option side controller which is provided in an optional apparatus indicated by the select signal accepting the command signal; a storage section which is provided in each of the optional apparatuses, the storage section storing the accepted command signal under a control executed by the option side controller; and a command executing section which is provided in each of the optional apparatuses, the command executing section executing a processing in accordance with the accepted command signal under a control executed by the option side controller, wherein when a command-save-bit which is a predetermined bit among bits constituting the accepted command signal is in a predetermined state, the option side controller controls the storage section to store the command signal and prohibits the command executing section from executing a processing in accordance with the command signal, and when the accepted select signal is a signal indicating a simultaneous communication, the option side controller reads the command signal stored in the storage section and controls the command executing section to execute a processing in accordance with the command signal.

These and other objects, features and advantages of the present invention will become more apparent upon reading of the following detailed description along with the accompanied drawings.

BRIEF DESCRIPTION OF THE DRAWINGS

FIG. 2 shows patterns of select lines and selected states of PFs corresponding respectively to the patterns.

DETAILED DESCRIPTION OF THE PREFERRED EMBODIMENTS

Hereinafter, an image forming apparatus in accordance with an embodiment of the present invention will be described with reference to the drawings. In the present embodiment, a printer is described as an example of an image forming apparatus, and especially a printer provided with a plurality of paper feeders (hereinafter, referred to as "PF") as optional apparatuses will be described as optional apparatuses. However, the optional apparatuses may be apparatuses other than the PFs (for example, the optional apparatuses may be post processing apparatuses such as an automatic document feeding device (ADF), a stapler, and the like). Further, the image forming apparatus is not limited to a printer but may be a copying machine, a facsimile machine, and a complex machine having functions of those including a plurality of optional apparatuses connected to an apparatus main body through a bus. Further, a four-drum tandem printer of an intermediate transfer type will be described in the present embodiment, but the printer may adopt other type. In the present embodiment, a color printer will be described as an example, but the printer may be a monochromatic printer.

Figure 1:
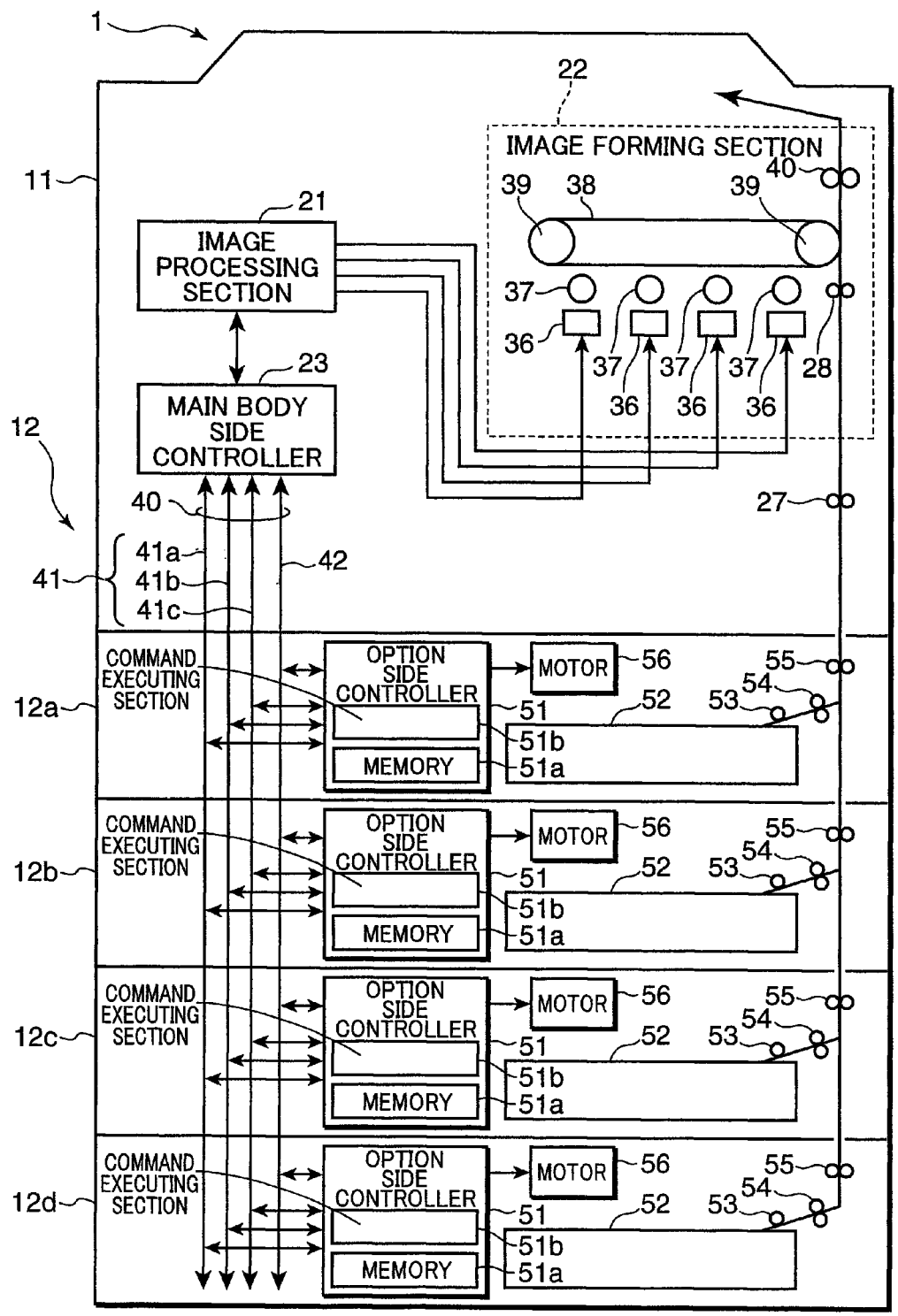
FIG. 1 is a block diagram showing a configuration of a printer.

FIG. 1 is a block diagram showing a configuration of a printer 1. The printer 1 includes an apparatus main body 11 and PFs 12a, 12b, 12c, and 12d (hereinafter, collectively referred to as "PF12"). The apparatus main body 11 forms a color image on a sheet in accordance with inputted image data and includes an image processing section 21, an image forming section 22, and a main body side controller 23. The PF12 includes an option side controller 51, a sheet tray 52, a motor 56, and a sheet supplying/conveying mechanism configured by a plurality of rollers and sensors. Further, each option side controller 51 includes a memory 51a and a command executing section 51b.

The apparatus main body 11 and each PF12 can perform communication of commands and data through a bus line 40 including select line 41a, 41b, and 41c (hereinafter, collectively referred to as "select lines 41") and a serial line 42. Specifically, the main body side controller 23 and each option side controller 51 are connected to the bus line 40, and the main body side controller 23 outputs a select signal for specifying a destination PF12 to the select lines 41 and transfers a command signal in a serial transfer through the serial line 42.

The select signal is a signal which is allocated individually to each PF 12. The option side controller 51 accepts the command signal from the serial line 42 in a case where the select signal indicates the apparatus in which the option side controller 51 is provided. The option side controller 51 outputs a response signal which indicates acceptance of the command signal to the main body side controller 23. The option side controller 51 includes a command executing section 51b. The command executing section 51b, under a control by the option side controller 51, executes a processing in accordance with the command signal. Details regarding transmission of signals between the main body side controller 23 and a respective option side controller 51 of each PF 12 will be described later.

The image processing section 21 of the apparatus main body 11 applies an image processing such as an image correction, enlargement, reduction, and the like to the inputted image data. The image processing section 21 forms data of respective colors including yellow, cyan, magenta, and black and outputs the data to the image forming section 22.

The image forming section 22 forms (prints) a color image onto a sheet in accordance with image data which is processed by the image processing section 21, and includes exposure devices 36, photoconductive drums 37, an intermediate transferring belt 38, driving rollers 39, and a fixing roller 40.

When the image forming is performed, firstly, respective peripheral surface of the photoconductive drums 37 are evenly charged by a charging device (not illustrated). Then, the exposure devices 36 irradiate a light to the surfaces of the photoconductive drums 37 respectively in accordance with image data of respective colors to form electrostatic latent images. Thereafter, developing devices (not illustrated) supply toner onto the surfaces of the photoconductive drums 37 respectively, so that toner images are formed. The toner images are primarily transferred onto the intermediate transferring belt 38.

On the other hand, a sheet stored in a sheet tray 52 of a selected PF 12 is conveyed by a sheet-conveying mechanism that includes rollers 27 to a secondary transfer position through the registration roller 28. Then, the toner images formed on the intermediate transferring belt 38 are secondarily transferred onto the sheet. Thereafter, the toner image on the sheet is fixed by the fixing roller 40 and discharged to the sheet-discharging tray (not illustrated).

The PF 12 is a type of stacking a plurality of PFs in a vertical direction and is detachably mounted to the apparatus main body 11. In the present embodiment, the case of providing four PFs will be described as an example, but the number of PFs is not limited to four. The option side controller 51 is adapted to accept a signal and data outputted from the main body side controller 23 to collectively control respective elements constituting the PF 12. The sheet-conveying mechanism is configured by various rollers such as pickup rollers 53, conveying rollers 54 and 55, and sensors which detect rotation of the rollers and sheets to be conveyed. The rollers are operated by outputs of the motor 56 driven under control of the option side controller 51.

Next, transmission of signals between the main body side controller 23 and the option side controller 51 of each PF 12 will be described in detail. When the option side controller 51 accepts a command signal from the main body side controller 23, the option side controller 51 controls the command executing section 51b to execute a processing in accordance with the signal. However, in a case where a predetermined bit among bits constituting the command signal (hereinafter, referred to as "command-save-bit") is true, the command signal includes a command which is to be executed concurrently when the simultaneous communication which will described later is performed. Therefore, the option side controller 51 controls the command executing section 51b not to execute the processing corresponding to the command signal and stores the command signal to the memory 51a. The command-save-bit is, for example, a bit allocated to control ON or OFF of parts, for example, the motor 56 and a clutch (not illustrated) whose operations are controlled by a command signal transmitted from the main body side controller 23 among parts constituting the PF 12. In this case, the main body side controller 23 uses the command-save-bit at a timing at which operations of the motor 56 and the clutch are not effective, and stores the command signal in the memory 51a.

Further, communications with the main body side controller 23 include a select communication of selecting at least one from the PF 12 and a simultaneous communication of simultaneously communicating with all the PF 12. FIG. 2 is an example of a selection state of patterns of the select lines 41 and corresponding PF 12. For example, in a case where the pattern of the select lines 41 is "001," in other words, the select line 41a and 41b are '0', and the select line 41c is '1', the option side controller 51 of the PF 12a identifies itself as being selected and accepts the command signal from the serial line 42. Further, in the case where the pattern of the select lines 41 is "011," in other words, in the case where the select line 41a is '0', and the select line 41b and 41c are '1', the option side controller 51 of the PF 12c identifies itself as being selected, and accepts the command signal from the serial line 42.

On the other hand, in the case where the pattern of the select line is "111," in other words, all of the select line 41a, 41b, and 41c are '1', the option side controllers 51 of PF 12 identifies the simultaneous communication, and reads the command signal stored in the memory 51a and controls the command executing section 51b to execute the processing simultaneously.

Figure 3:
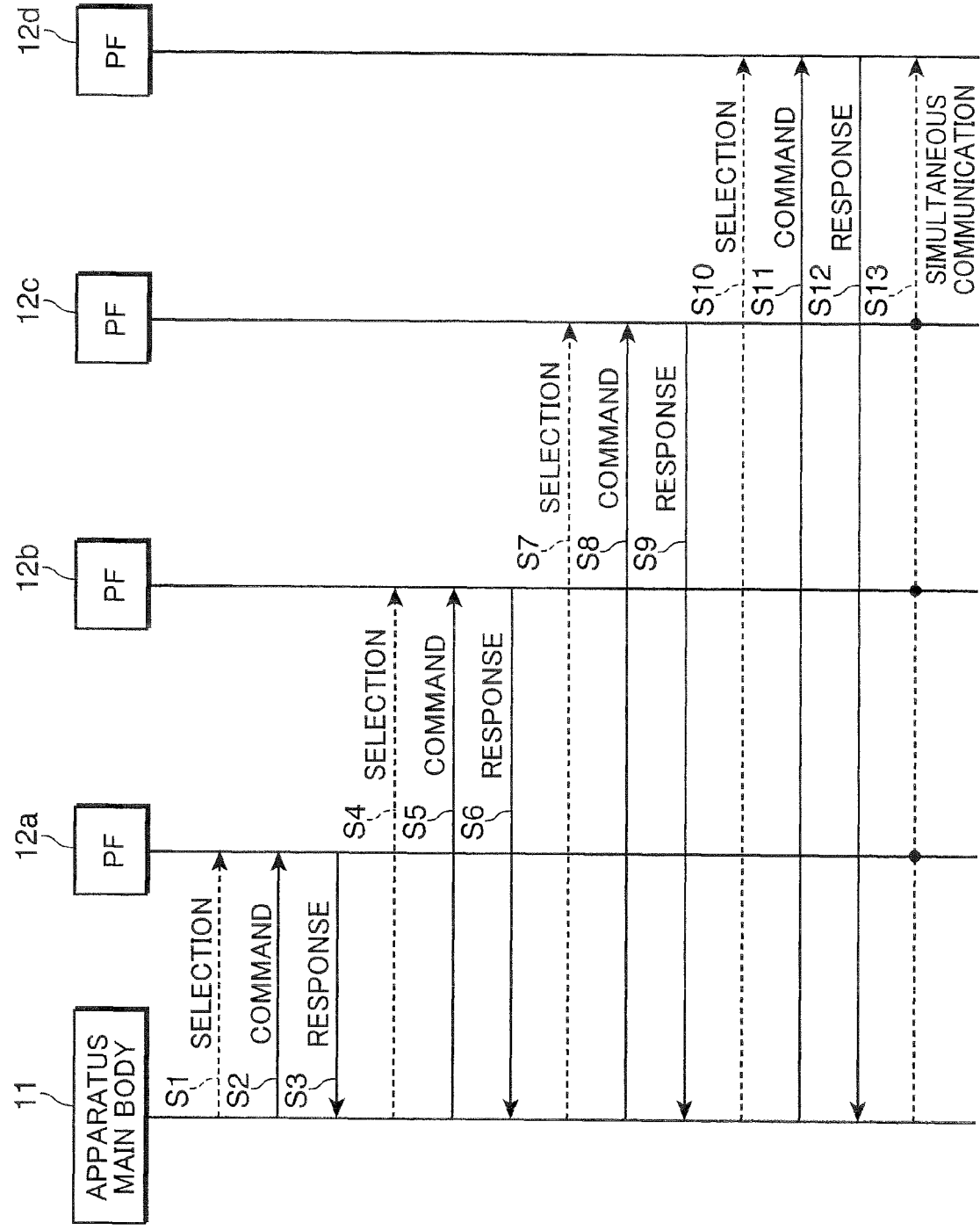
FIG. 3 is a sequence diagram showing a signal transmission performed between a main body side controller and each option side controller.

The signal transmission processing executed between the main body side controller 23 and each option side controller 51 of the PF 12 will be described in specifically with reference to FIG. 3. FIG. 3 is a sequence diagram showing a signal transmission performed between the main body side controller 23 and each option side controller 51 of the PF 12.

In a case where the PF 12a is selection for the select communication, the main body side controller 23 outputs a select signal having a pattern of "001" (signal S1), and outputs a command signal to the serial line (signal S2). The option side controller 51 of the PF 12a accepts the select signal and identifies itself as being selected. After accepting the command signal, the option side controller 51 outputs a response signal to the main body side controller 23 (signal S3), and controls the command executing section 51b to execute a processing in accordance with the command signal.

Similarly, in a case where the PF 12b is selected for the select communication, the main body side controller 23 outputs a select signal having a pattern of "010" (signal S4), and outputs a command to the serial line (signal S5). The option side controller 51 of the PF 12b accepts the select signal and identifies itself as being selected. After accepting the command signal, the option side controller 51 outputs a response signal to the main body side controller 23 (signal S6), and controls the command executing section 51b to execute a processing in accordance with a command signal.

Also in the cases of selecting the PF 12c and PF 12d for the select communication, the processing is executed in the similar order (signals S7-S12).

In a case where a command-save-bit among bits constituting the command signal is true, the command signal is a signal which includes a command to be executed simultaneously when the simultaneous communication is performed. Therefore, the option side controller 51 does not execute a processing corresponding to the command signal and stores the command signal to the memory 51*a*.

Further, in the case where the simultaneous communication with all of the PF12 is performed, the main body side controller 23 outputs a select signal having a pattern of "111" (signal S13). When each option side controller 51 accepts a select signal indicating the simultaneous communication, it reads a command signal from the memory 51*a* and controls the command executing section 51*b* to perform the processing corresponding to the command signal.

Conventionally, when the command signal is transmitted to all of the option side controllers 51 in the simultaneous communication, the number of option side controllers 51 as load increases to be greater than the case of the select communication. Accordingly, it has been necessary to set a signal level be high in advance to prevent lowering of level in command signal to be serially transferred. In other words, it was necessary to provide a communication circuit which can output a high-level command signal to the apparatus main body, thus increasing the cost.

However, as described above, a command signal corresponding to a processing which should be executed simultaneously is outputted in advance in a select communication to each option controller 51, and the command signal is temporarily stored in the memory 51*a*, and thereafter the main body side controller 23 outputs a select signal indicating the simultaneous communication. Accordingly, each option side controller 51 controls the command executing sections 51*b* to execute simultaneously the processing corresponding to the command signal stored in the memories 51*a*. Since it is not necessary to set a communication circuit which can transmit a command signal of a high signal level, so that the cost can be suppressed. Further, as a command-save-bit, for example, a bit for controlling ON or OFF of the motor 56, the clutch (not illustrated), and the like is allocated, so that it is not necessary to newly set a command for defining a command-save-bit.

Figure 4:
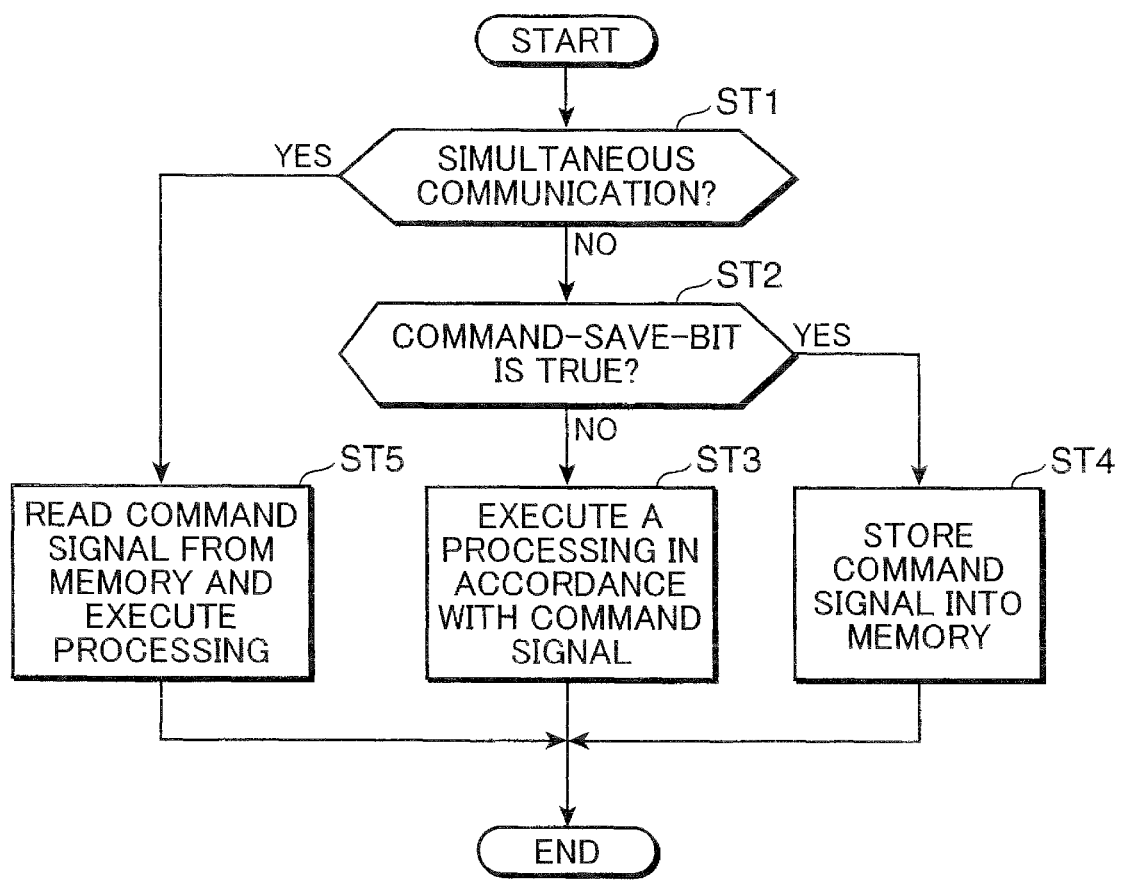
FIG. 4 is a flowchart showing a flow of operations of the main body side controller and the option side controller.

FIG. 4 is a flowchart showing operations of the main body side controller 23 and the option side controller 51. Firstly, in a case where a pattern of a select signal outputted from the main body side controller 23 does not indicate the simultaneous communication (step ST1; NO), the option side controller 51 of the PF12 selected by the select signal determines whether the command-save-bit is true (step ST2). In a case where the command-save-bit is not true (step ST2; NO), the option side controller 51 controls the command executing section 51*b* to execute a processing in accordance with the command signal (step ST3). In a case where the command-save-bit is true (step ST2; YES), the option side controller 51 stores the contents of the command signal to the memory 51*a* (step ST4).

On the other hand, in a case where the pattern of the select signal outputted from the main body side controller 23 indicates the simultaneous communication (step ST1; YES), all of the option side controllers 51 read the command signal from the memory 51*a* and controls the command executing section 51*b* to execute the processing corresponding to the command signal (step ST5).

As described above, a command signal corresponding to a processing which should be executed simultaneously by each option side controller 51 is outputted in advance in the select communication, and the command signal is stored temporarily in the memory 51*a*, and the main body side controller 23 outputs a select signal indicating the simultaneous communication. Accordingly, the option side controller 51 controls the command executing section 51*b* to execute simultaneously the processing corresponding to the command signal stored in the memory 51*a*. Thus, it is not necessary to set a communication circuit which can transmit a command signal of a high signal level, so that the cost can be suppressed and the simultaneous communication can be performed easily. Further, as a command-save-bit, for example, a bit for controlling ON or OFF of the motor 56, the clutch (not illustrated) and the like is allocated, so that it becomes unnecessary to newly set a command for defining the command-save-bit.

The present embodiment can be suitably changed within the scope not departing from its content. For example, in the present embodiment, it is described that the main body side controller 23 transfers the command signal in a serial transfer through the serial line. However, the command signal may be transferred in a parallel transfer using a plurality of signal lines.

In summary, according to an aspect of the present invention, an electronic equipment system is provided with an apparatus main body and a plurality of optional apparatuses connected to the apparatus main body through a bus line which is capable of transmitting and receiving a signal, the electronic equipment system includes: a main body side controller which is provided in the apparatus main body, the main body side controller outputting a command signal and a select signal to each of the optional apparatuses through the bus line; an option side controller which is provided in each of the optional apparatuses, the option side controller which is provided in an optional apparatus indicated by the selected signal accepting the command signal; a storage section which is provided in each of the optional apparatuses, the storage section storing the accepted command signal under a control executed by the option side controller; and a command executing section which is provided in each of the optional apparatuses, the command executing section executing a processing in accordance with the accepted command signal under a control executed by the option side controller. When a command-save-bit which is a predetermined bit among bits constituting the accepted command signal is in a predetermined state, the option side controller controls the storage section to store the command signal and prohibits the command executing section from executing a processing in accordance with the command signal, and when the accepted select signal is a signal indicating a simultaneous communication, the option side controller reads the command signal stored in the storage section and controls the command executing section to execute a processing in accordance with the command signal.

According to the aspect of the invention, the main body side controller can output in advance a command signal which should be stored. Therefore, for example, the main body side controller outputs in advance a command signal indicating a processing which should be executed by all of the command executing section simultaneously, so that the collect signal can be once stored in the storage device. Thereafter, the main body side controller outputs a select signal indicting a simultaneous communication, so that each option side controller can execute simultaneously a processing corresponding to the command signal accepted in advance by the command executing section (in other words, the command signal stored in the storage device). Unlike the conventional manner, the main body side controller does not need to output a command signal to all of the option side controllers. Thus, it is not necessary to especially provide a communication circuit for outputting a signal of a high level signal so as not to lower the signal level, and the cost can be suppressed, so that the simultaneous communication can be performed easily.

For example, in the conventional technology, in the case where the command signal is transferred from an apparatus main body to all of sheet trays in a serial transfer, it has been necessary to set the signal level be high in advance to prevent lowering in level of the command signal, and the cost for providing a communication circuit which can output a serial signal of a high level to the apparatus main body arises. However, according to the present invention, the apparatus main body can perform the simultaneous communication with a plurality of optional apparatuses, without especially providing a circuit.

Further, according to another aspect of the present invention, an electronic equipment includes: a bus line which is for use in outputting a command signal and a select signal to a plurality of optional apparatuses; and a main body side controller which outputs a command signal and a select signal to the plurality of optional apparatuses through the bus line. When controlling a storage section provided in the optional apparatus to store the command signal, the main body side controller changes a command-save-bit, which is a predetermined bit among bits constituting the command signal, to be in a predetermined state and outputs the command signal, and the main body side controller, when controlling each of the optional apparatuses to execute a processing in accordance with the command signal stored in the storage section, the main body side controller changes the select signal to be in a predetermined pattern indicating a simultaneous communication and outputs the select signal.

Further, according to an aspect of the present invention, the electronic equipment is an apparatus main body of an image forming apparatus and includes an image forming section which forms an image on a recording medium in accordance with image data, and the plurality of optional apparatuses can be connected to the electronic equipment as add-on.

According to the aspects of the invention, the main body side controller can output in advance a command signal which should be stored. Accordingly, for example, a command signal indicating a processing which should be performed simultaneously is transmitted to all of the optional apparatuses in advance, so that the content of the command signal is temporarily stored in the storage device. Thereafter, the main body side controller outputs a select signal indicating the simultaneous communication signal, so that the optional apparatuses can execute simultaneously the processing in accordance with the command signal accepted in advance (in other words, the command signal stored in the storage device). Accordingly, unlike the conventionally technology, the main body side controller does not need to output a command signal to all of the optional apparatuses simultaneously. Thus, it is not necessary to especially provide a communication circuit which can output a signal of a high level so as not to lower the signal level, and the cost can be suppressed, so that the simultaneous communication can be performed easily.

Further, according to an aspect of the present invention, an optional apparatus includes: an option side controller which accepts a command signal outputted from an apparatus main body through a bus line when a select signal outputted from the apparatus main body through the bus line indicates an optional apparatus in which the optional side controller is provided; a storage section which stores the command signal accepted by a control of the option side controller; and a command executing section which executes a processing in accordance with the command signal accepted by a control of the option side controller. When a command-save-bit which is a predetermined bit among bits constituting the accepted command signal is in a predetermined state, the option side controller controls the storage section to store the command signal and prohibits the command executing section from executing a processing in accordance with the command signal, and when the accepted select signal is a signal indicating a simultaneous communication, the option side controller reads the command signal stored in the storage section and controls the command executing section to execute a processing in accordance with the command signal.

Further, according to an aspect of the present invention, the optional apparatus can be connected to the apparatus main body of the image forming apparatus as add-on, and when a select signal outputted from the apparatus main body through a bus line indicates an optional apparatus in which the optional side controller is provided, the option side controller accepts the command signal outputted from the apparatus main body through the bus line.

According to these aspects of the invention, since the apparatus main body can output in advance the command signal which should be stored, so that by outputting in advance the command signal indicating a processing which should be executed simultaneously is outputted to, for example, all of the command executing section, so that the content of the command signal can be stored temporarily in the storage device. After that, the apparatus main body outputs a select signal indicating a simultaneous communication signal, so that the option side controller can control the command executing section to execute simultaneously a processing in accordance with the command signal accepted in advance (in other words, the command signal stored in the storage device). Unlike the conventional manner, the main body side controller does not need to output a command signal to all of the option side controllers. Thus, it is not necessary to especially provide a communication circuit for outputting a signal of a high level signal so as not to lower the signal level, and the cost can be suppressed, so that the simultaneous communication can be performed easily.

Further, according to an aspect of the present invention, the main body side controller allocates the command-save-bit to a bit instructing ON or OFF to parts of the optional apparatuses among bits constituting the command signal, and outputs the command signal.

According to this aspect of the invention, a bit for instructing ON or OFF of the parts constituting the optional apparatuses is allocated as a command-save-bit. Accordingly, it is not necessary to newly set a command for defining the command-save-bit.

This application is based on Japanese Patent application serial No. 2008-055719 filed in Japan Patent Office on Mar. 6, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An electronic equipment system provided with an apparatus main body and a plurality of optional apparatuses connected to the apparatus main body through a bus line which is capable of transmitting and receiving a signal, the bus line including a select line and a serial line, the electronic equipment system comprising:

a main body side controller which is provided in the apparatus main body, the main body side controller outputting a command signal through the serial line and selectively outputting one of a signal indicating an optional apparatus as a destination or a signal instructing all of the optional apparatus to perform simultaneous communication through the select line as a select signal, to each of the optional apparatuses;

an option side controller which is provided in each of the optional apparatuses, the option side controller which is provided in an optional apparatus indicated by the select signal accepting the command signal;

a storage section which is provided in each of the optional apparatuses, the storage section storing the accepted command signal under a control executed by the option side controller; and a command executing section which is provided in each of the optional apparatuses, the command executing section executing a processing in accordance with the accepted command signal under a control executed by the option side controller, wherein when a command-save-bit which is a predetermined bit among bits constituting the accepted command signal is in a predetermined state, the option side controller controls the storage section to store the command signal and prohibits the command executing section from executing a processing in accordance with the command signal, when the command-save-bit is not in the predetermined state, the option side controller prohibits the storage section from storing the command signal and controls the command executing section to execute a processing in accordance with the command signal, and when the accepted select signal is a signal indicating the simultaneous communication, the option side controller reads the command signal stored in the storage section in advance and controls the command executing section to execute a processing in accordance with the command signal.

2. The electronic equipment system according to claim 1, wherein the main body side controller allocates the command-save-bit to a bit instructing ON or OFF to parts of the optional apparatuses among bits constituting the command signal, and outputs the command signal.

3. An electronic equipment comprising:
a bus line that includes a serial line for use in outputting to a plurality of optional apparatuses a command signal and a select line for use in selectively outputting to the plurality of optional apparatuses one of a signal indicating an optional apparatus as a destination or a signal instructing all of the optional apparatuses to perform simultaneous communication as a select signal; and a main body side controller which outputs a command signal and a select signal to the plurality of optional apparatuses through the bus line, wherein when controlling a storage section provided in the optional apparatus to store the command signal, the main body side controller changes a command-save-bit, which is a predetermined bit among bits constituting the command signal, to be in a predetermined state and outputs the command signal, when controlling a command executing section provided in the optional apparatus to execute the command signal, the main body side controller changes the command-save-bit not to be in the predetermined state and outputs the command signal, and the main body side controller, when controlling each of the optional apparatuses to execute a processing in accordance with the command signal stored in the storage section in advance, the main body side controller changes the select signal to be in a predetermined pattern indicating the simultaneous communication and outputs the select signal.

4. The electronic equipment according to claim 3, wherein the main body side controller allocates the command-save-bit to a bit instructing ON or OFF to parts of the optional apparatuses among bits constituting the command signal, and outputs the command signal.

5. The electronic equipment according to claim 3, wherein the electronic equipment is an apparatus main body of an image forming apparatus and includes an image forming section which forms an image on a recording medium in accordance with image data, and the plurality of optional apparatuses can be connected to the electronic equipment as add-on.

6. An optional apparatus comprising:
an option side controller which accepts a command signal outputted from an apparatus main body through a serial line included in a bus line when a select signal outputted from the apparatus main body through a select line included in the bus line indicates an optional apparatus in which the optional side controller is provided;

a storage section which stores the command signal accepted by a control of the option side controller; and a command executing section which executes a processing in accordance with the command signal accepted by a control of the option side controller, wherein when a command-save-bit which is a predetermined bit among bits constituting the accepted command signal is in a predetermined state, the option side controller controls the storage section to store the command signal and prohibits the command executing section from executing a processing in accordance with the command signal, when the command-save-bit is not in the predetermined states, the option side controller prohibits the storage section from storing the command signal and controls the command executing section to execute a processing in accordance with the command signal, and when the accepted select signal is a signal indicating a simultaneous communication of all of the optional apparatuses, the option side controller reads the command signal stored in the storage section in advance and controls the command executing section to execute a processing in accordance with the command signal.

7. The optional apparatus according to claim 6, wherein when the command-save bit which is allocated to a bit instructing ON or OFF to parts of the optional apparatus among bits constituting the command signal is in a predetermined state, the option side controller controls the storage section to store the command signal.

8. The optional apparatus according to claim 6, wherein the optional apparatus can be connected to the apparatus main body of the image forming apparatus as add-on, when a select signal outputted from the apparatus main body through a bus line indicates an optional apparatus in which the optional side controller is provided, the option side controller accepts the command signal outputted from the apparatus main body through the bus line.

* * * * *